United States Patent [19]

Ernst et al.

[11] Patent Number: 4,512,184
[45] Date of Patent: Apr. 23, 1985

[54] MOUNTING ARRANGEMENT FOR ANGLE MEASURING DEVICE

[75] Inventors: Alfons Ernst, Traunreut; Arthur Brunner, Trostberg, both of Fed. Rep. of Germany

[73] Assignee: Dr. Johannes Heidenhain GmbH, Traunreut, Fed. Rep. of Germany

[21] Appl. No.: 517,349

[22] Filed: Jul. 26, 1983

[30] Foreign Application Priority Data

Jul. 30, 1982 [DE] Fed. Rep. of Germany ....... 3228507

[51] Int. Cl.$^3$ ............................................ G01M 15/00
[52] U.S. Cl. .................................. 73/116; 250/231 SE
[58] Field of Search ................... 73/116; 250/231 SE; 29/406; 310/42

[56] References Cited

U.S. PATENT DOCUMENTS 4,031,441 6/1977 Garrett .................... 250/231 SE X
4,345,149 8/1982 Blaser .......................... 250/231 SE

OTHER PUBLICATIONS

Fotoelektrische Winkel- und Wegschrittgeber, from Ernst Leitz GmbH Wetzlar by Verf.Dipl.-Phys. F. Hock.

Primary Examiner—Jerry W. Myracle
Attorney, Agent, or Firm—Willian Brinks Olds Hofer Gilson & Lione Ltd.

[57] ABSTRACT

An angle measuring device which includes a graduated disc and a stator is mounted to an external drive unit which includes a drive shaft and an attachment surface. The graduated disc is fixedly mounted to the drive shaft such that it is the drive shaft which guides the movement of the disc. The stator is mounted directly to the attachment surface such that the stator does not guide the movement of the graduated disc. In order to align the stator properly with respect to the drive shaft and the graduated disc, a centering collar is provided on the attachment surface, concentric with the drive shaft. The centering collar interacts with at least two alignment surfaces defined by the stator. These alignment surfaces are positioned to define the desired orientation of the stator with respect to the drive shaft.

12 Claims, 6 Drawing Figures

FIG. 2
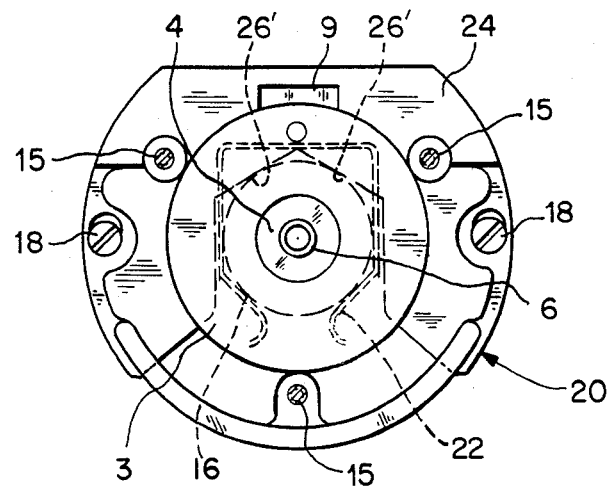
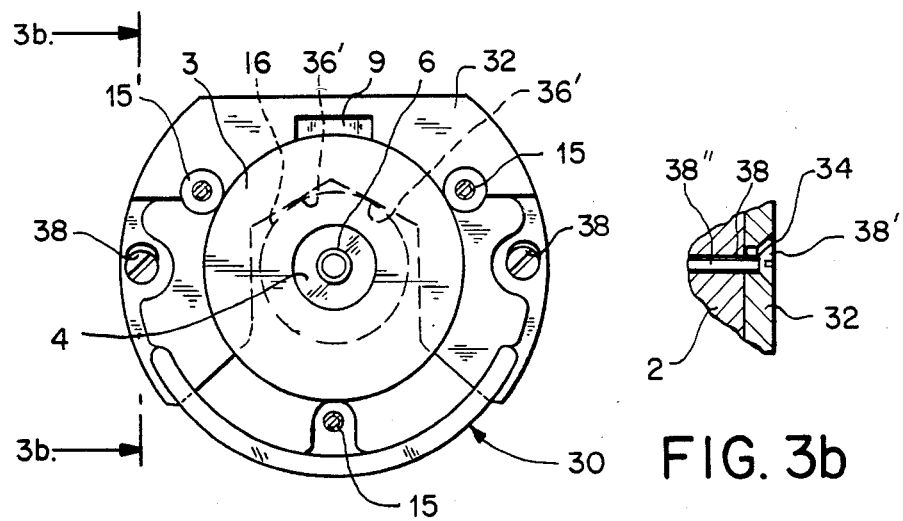 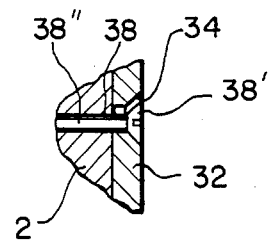
FIG. 3a    FIG. 3b

MOUNTING ARRANGEMENT FOR ANGLE MEASURING DEVICE

BACKGROUND OF THE INVENTION

The present invention relates to an improved mounting arrangement for angle measuring devices of the type which include a graduated disc, a connecting hub mounted to the disc and secured to the drive shaft of an external drive unit, a stator mounted to an attachment surface of the external drive unit, and a scanning unit mounted to the stator to scan the disc.

In angle measuring devices of the type described above, the graduation disc is mounted without a bearing of its own. Rather, the graduation disc is mounted to an element, such as the drive shaft of a motor, for example, which is provided with its own external bearings. Another prior art approach is to provide the angle measuring device with a journaled shaft of its own which includes bearings for guiding rotary movement of the graduated disc with respect to the stator. In comparison the first system described above which contemplates the direct fastening of the stator to the drive unit, this second approach requires an additional bearing, an additional shaft, and some means for coupling the angle measuring device shaft to the external shaft. Thus, the direct fastening of the stator to the drive unit provides a particularly simple and economical construction. Furthermore, by directly fastening the stator to the drive unit and the graduated disc to the drive shaft, any possible twisting of the coupling between the graduated disc and the drive shaft as a result of angular acceleration of the drive shaft can be eliminated, along with frictional torques associated with graduated disc bearings. Finally, the total length of an angle measuring device which is directly mounted to the drive unit can be substantially reduced as compared to an angle measuring device in which a separate bearing shaft is provided for the graduated disc.

A disadvantage of prior art angle measuring systems in which the stator is directly mounted to the drive unit relates to the precision with which the angle measuring unit must be aligned. Since the graduated disc is mounted to the drive shaft of the drive unit and the stator of the angle measuring device is mounted to an attachment surface of the drive unit, the graduated disc must be precisely oriented with respect to the stator during the installation procedure. Thus, it has often proven to be necessary to perform precise adjusting operations during the mounting of such angle measuring devices. Depending upon the precision of the angular graduation used on the graduated disc, expensive calibration devices, qualified personnel, and significant time delays are often required to mount such angle measuring devices properly in place.

There is known to the prior art an angle measuring device which incorporates a two-part stator. This prior art device is installed by mounting first the lower part of the stator to the drive unit. For example, this lower part may serve to mount the illuminating arrangement and the scanning plate of the angle measuring system. This lower part is positioned precisely with respect to the external drive shaft of the drive unit by a calibration device. Then the graduation plate is positioned on the external drive shaft and clamped in place via its connecting hub. Finally, the upper part of the stator, which includes photosensors and pulse forming circuitry, is installed on the lower part of the stator and a casing cap which includes electrical conductors is mounted in place. In this prior art device, the photosensors mounted on the upper part of the stator must be arranged in place precisely with respect to the lower part of the stator. For this reason, an adjusting operation is required in order to mount this angle measuring device in place, or alternately, increased expenditures for fitting pins or similar arrangements must be accepted. Furthermore, the electrical conductors between the upper and lower parts of the stator must either be arranged to be flexible or be provided with connectors. Both of these approaches can lead to measuring errors.

Another prior art device utilizes a stator which is sickle-shaped. In mounting this second prior art device in place to an external drive unit, the graduated disc is first mounted to the external drive shaft via a connecting hub, and then the complete stator is placed on the attachment surface of the external drive unit and shifted transversely to the drive shaft until the scanning unit is oriented properly with respect to the graduated disc. In mounting this second prior art device in place, an adjusting operation is required to align the scanning unit properly with respect to the external drive shaft and the connecting hub, both in radial and tangential directions.

SUMMARY OF THE INVENTION

The present invention is directed to an improved mounting arrangement for an angle measuring device which allows exact alignment of the stator with respect to an external drive unit as the stator is fastened to the attachment surface of the drive unit. The present invention substantially eliminates the need for time consuming and expensive adjustment procedures.

According to this invention, an angle measuring device of the type described initially above is mounted to an external drive unit which incorporates means for defining a centering collar on the attachment surface of the external drive unit. This centering collar is positioned concentric with the external drive shaft. The stator of the angle measuring device is provided with means for defining a plurality of alignment surfaces on the stator, and these alignment surfaces are positioned to engage the centering collar in order to center the stator on this attachment surface with respect to the external drive shaft, and thereby to align the scanning unit properly with the graduated disc during the mounting of the stator to the attachment surface.

The present invention provides the important advantage that the stator is automatically aligned with respct to the external drive shaft and the connecting hub of the graduated disc as the stator is mounted to the attachment surface of the external drive unit. Thus, such an angle measuring device can be mounted in place on an external drive unit by the user himself in a simple manner, without expensive adjusting or calibrating devices, without the use of specially trained personnel, and without substantial expenditures of time. Further advantageous features of this invention are set forth in the dependent claims.

The invention itself, together with further objects and attendant advantages, will best be understood by reference to the following detailed description taken in conjunction with the accompanying drawings.

BRIEF DESCRIPTION OF THE DRAWINGS

FIG. 1b is a sectional view taken along line 1b—1b of FIG. 1a.

FIG. 1c is a sectional view taken along line 1c—1c of FIG. 1a.

FIG. 2 is a sectional view taken in a plane corresponding to that of FIG. 1a of a second preferred embodiment of this invention.

FIG. 3a is a sectional view taken in a plane corresponding to that of FIG. 1a of a third preferred embodiment of this invention.

FIG. 3b is a sectional view taken along line 3b—3b of FIG. 3a.

DETAILED DESCRIPTION OF THE PRESENTLY PREFERRED EMBODIMENTS

Figure 1A:
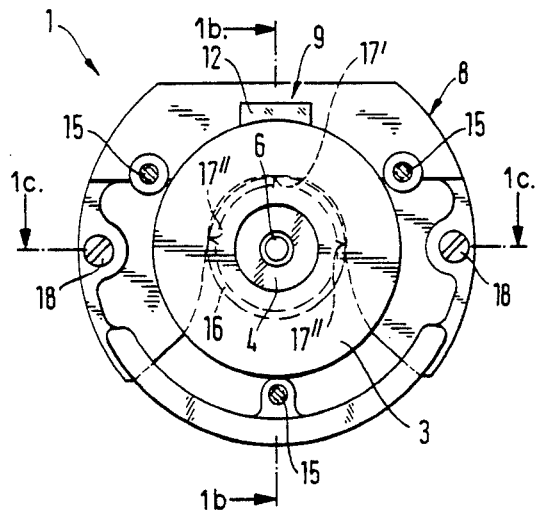
FIG. 1a is a sectional view taken along line 1a—1a of FIG. 1b of an angle measuring device which incorporates a first preferred embodiment of this invention.
Figure 1B:
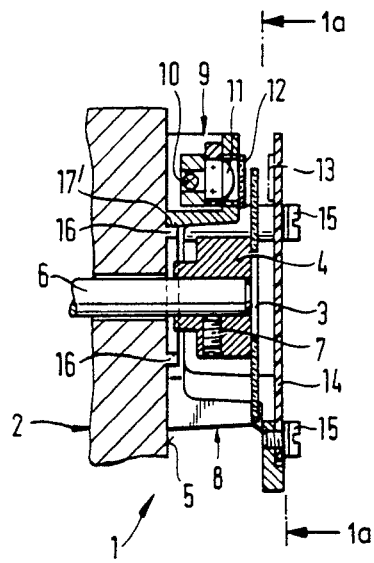
Figure 1C:
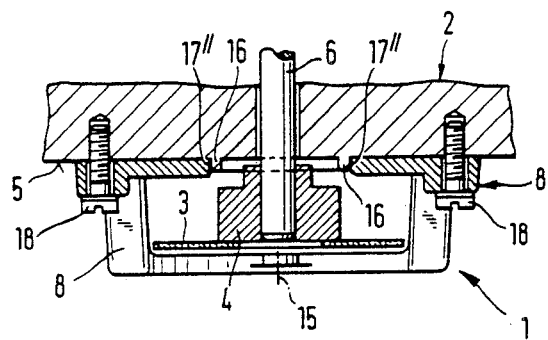

Turning now to the drawings, FIGS. 1a–1c provide three sectional views of an angle measuring device 1 which incorporates a first preferred embodiment of this invention. The angle measuring device 1 is attached to an external drive unit 2, for example a motor. The angle measuring device 1 includes a graduated disc 3 which is firmly secured to a connecting hub 4. The external drive unit 2 includes an attachment surface 5 and an external drive shaft 6. The external drive shaft 6 rotates about its axis, and the angle measuring device 1 operates to measure the angular position of the shaft 6. The graduated disc 3 is rigidly mounted to the external drive shaft 6 by the connecting hub 4. After the connecting hub 4 is slipped onto the drive shaft 6, the hub 4 and therefore the disc 3 are fastened securely in place on the shaft 6 by means of a clamping screw 7. Thus, it is the bearings (not shown) which guide the rotation of the shaft 6 which guide the rotation of the disc 3 as well.

The angle measuring device 1 also includes a casing which takes the form of a stator 8. A scanning unit 9 which includes a lamp 10, a condensor lens 11, a scanning plate 12, and a plurality of photosensors 13 is mounted in the interior of the stator 8 so as to scan the angular graduation of the graduated disc 3 in the usual manner. The photosensors 13 as well as an evaluating circuit (not shown) for the electric scanning signals generated by the photosensors 13 are mounted on a plate 14 which is fastened to the stator 8 by means of screws 15.

Since the connecting hub 4 and the graduated disc 3 are rotatably mounted not by the stator 8 but by means of the bearings (not shown) for the drive shaft 6 in the external drive unit 2, the present invention provides means for readily and reliably centering the stator 8 with respect to the graduated disc 3 and the drive shaft 6 during the mounting of the stator 8 onto the attachment surface 5 of the external drive unit 2. According to this invention, a centering collar 16 is provided on the attachment surface 5. This centering collar 16 is arranged concentrically with respect to the drive shaft 6. Furthermore, a stop surface 17' and two fitting surfaces 17" are defined by the stator 8 adjacent to the mounting or attachment surface 5. In the preferred embodiment of FIGS. 1a–1c, the stop surface 17' and the two fitting surfaces 17" together make up a set of three alignment surfaces which are arranged in a "U"-shaped configuration. In order to mount the stator 8 onto the attachment surface 5, the stator 8 is positioned upon the attachment surface 5 outside of the graduated disc 3, and then the stator 8 is shifted radially toward the drive shaft 6, guided by the fitting surfaces 17". This radial motion is continued until the stop surface 17' of the stator 8 contacts the centering collar 16 of the attachment surface 5. Once the three alignment surfaces 17', 17" are properly brought into contact with the centering collar 16, the stator 8 is secured and locked in this aligned position by means of the screws 18. In this way, proper alignment of the stator with respect to the shaft 6 is obtained simply and reliably, without the need for any complex adjusting operation.

FIG. 2 shows a measuring device 20 which incorporates a second preferred embodiment of this invention. In FIG. 2, identical reference numbers are used to those of FIGS. 1a–1c for corresponding components. The embodiment of FIG. 2 differs from that of FIGS. 1a–1c in that the stator 24 defines two stop surfaces 26' which act as alignment surfaces and are oriented in a "V" shape. In a manner similar to that described above, these two stop surfaces 26' cooperate with the centering collar 16 to orient the stator 24 properly. In addition, the embodiment of FIG. 2 includes a spring clip 22 which is mounted to the stator 24 to embrace and clamp around the centering collar 16 in order to bias the stop surfaces 26' into place in contact with the centering collar 16.

FIGS. 3a and 3b show a third preferred embodiment 30 of this invention which is in some ways similar to the embodiment of FIG. 2. As shown in FIG. 3, this third embodiment 30 includes a stator 32 which includes two stop surfaces 36' arranged in a "V" form. The embodiment of FIG. 3 differs from that of FIG. 2 in that it is the countersunk screws 38 which bias the stop surfaces 36' against the centering collar 16. As best shown in FIG. 3b, each of the screws 38 is provided with a tapered countersunk head 38' and a threaded shaft 38". The stator 32 defines two oblong, tapered depressions 34, which are offset with respect to corresponding threaded bores defined by the attachment surface. When the screws 38 are tightened in place, the countersunk heads 38' cooperate with the depressions 34 to generate a transverse force which ensures a secure engagement of the stop surfaces 36' of the stator 32 against the centering collar 16 of the attachment surface.

Of course, it should be understood that a range of changes and modifications to the preferred embodiments described above will be apparent to those skilled in the art. It is, therefore, intended that the foregoing detailed description be regarded as illustrative rather than limiting, and that it be understood that it is the following claims, including all equivalents, which are intended to define the scope of this invention.

We claim:

1. In an angle measuring device for an external drive unit, wherein the drive unit comprises a drive shaft and an attachment surface adjacent the drive shaft, and wherein the angle measuring device comprises a graduated disc, a connecting hub mounted to the disc and secured to the drive shaft, a stator mounted to the attachment surface, and a scanning unit mounted to the stator to scan the disc, the improvement comprising:

a centering collar defined by the attachment surface, concentric with the drive shaft; and a plurality of radial alignment surfaces defined by the stator, said alignment surfaces positioned to engage the centering collar in order to center the stator radially on the attachment surface with respect to the drive shaft, and thereby to align the scanning unit properly with the graduated disc, during the mounting of the stator to the attachment surface; said stator shaped to allow the stator to be mounted to and removed from the drive unit by radial movement of the stator with respect to the drive shaft while the disc is secured to the drive shaft in order simultaneously to mount and align both the stator and the scanning unit in place.

2. The invention of claim 1 wherein the plurality of alignment surfaces of the stator comprises a stop surface and at least two fitting surfaces arranged in a "U" configuration.

3. The invention of claim 1 wherein the plurality of alignment surfaces of the stator comprise at least two stop surfaces arranged in a "V" configuration.

4. The invention of claim 1 further comprising means for biasing at least some of the alignment surfaces of the stator into engagement with the centering collar.

5. The invention of claim 1 wherein the centering collar is formed in one piece with the attachment surface as a raised annular ridge integral with the attachment surface.

6. The invention of claim 5 wherein the attachment surface is planar around the annular ridge, and wherein the stator is mounted to the attachment surface by axially oriented fasteners.

7. The invention of claim 1 wherein the scanning unit comprises both a light source and at least one photosensor, and wherein the scanning unit is fixed to the stator such that the scanning unit and the stator can be mounted to and removed from the drive unit as an integrated assembly by radial movement of the stator with respect to the drive shaft while the disc is secured to the drive shaft.

8. The invention of claim 1 wherein the scanning unit is directly mounted to and in physical contact with the stator, and wherein the stator is directly mounted to and in physical contact with the attachment surface of the drive unit.

9. The invention of claim 1 wherein the diameter of the centering collar is less than that of the graduated disc.

10. The invention of claim 9 wherein the centering collar is positioned entirely between the attachment surface and the graduated disc.

11. In an angle measuring device for an external drive unit, wherein the drive unit comprises a drive shaft and an attachment surface adjacent the drive shaft, and wherein the angle measuring device comprises a graduated disc, a connection hub mounted to the disc and secured to the drive shaft, a stator mounted to the attachment surface, and a scanning unit mounted to the stator to scan the disc, the improvement comprising:
 means for defining a centering collar on the attachment surface, concentric with the drive shaft;
 means for defining a plurality of alignment surfaces on the stator, said alignment surfaces positioned to engage the centering collar in order to center the stator on the attachment surface with respect to the drive shaft, and thereby to align the scanning unit properly with the graduated disc, during the mounting of the stator to the attachment surface;
 means for biasing at least some of the alignment surfaces of the stator into engagement with the centering collar, said biasing means comprising:
 at least one spring mounted to the stator to embrace the centering collar.

12. In an angle measuring device for an external drive unit, wherein the drive unit comprises a drive shaft and an attachment surface adjacent the drive shaft, and wherein the angle measuring device comprises a graduated disc, a connecting hub mounted to the disc and secured to the drive shaft, a stator mounted to the attachment surface, and a scanning unit mounted to the stator to scan the disc, the improvement comprising:
 means for defining a centering collar on the attachment surface, concentric with the drive shaft;
 means for defining a plurality of alignment surfaces on the stator, said alignment surfaces positioned to engage the centering collar in order to center the stator on the attachment surface with respect to the drive shaft, and thereby to align the scanning unit properly with the graduated disc, during the mounting of the stator to the attachment surface;
 means for biasing at least some of the alignment surfaces of the stator into engagement with the centering collar, said biasing means comprising:
 means for defining at least one threaded bore in the attachment surface;
 means for defining at least one countersunk bore in the stator, offset with respect to respective ones of the threaded bores; and
 at least one countersunk screw having a threaded shaft engaged in the threaded bore and a head engaged in the countersunk bore, wherein the interaction between the head and the offset countersunk bore biases said at least some of the alignment surfaces of the stator into engagement with the centering collar.

* * * * *

UNITED STATES PATENT AND TRADEMARK OFFICE
CERTIFICATE OF CORRECTION

PATENT NO. : 4,512,184
DATED : April 23, 1985
INVENTOR(S) : Alfons Ernst and Arthur Brunner It is certified that error appears in the above-identified patent and that said Letters Patent is hereby corrected as shown below:

IN THE SUMMARY OF THE INVENTION

In Column 2, line 53, please delete "respct" and substitute therefor --respect--.

IN THE CLAIMS

In Claim 11 (Column 5, line 50), please delete "connection" and substitute therefor --connecting--.

Signed and Sealed this

Fourteenth Day of October, 1986

[SEAL]

Attest:

DONALD J. QUIGG

Attesting Officer

Commissioner of Patents and Trademarks